(12) United States Patent
Huxtable et al.

(10) Patent No.: US 7,770,861 B2
(45) Date of Patent: Aug. 10, 2010

(54) RESILIENT PROTECTOR TO PROTECT A STRUCTURE FROM AN IMPACT

(75) Inventors: Paul Stewart Huxtable, Trinity Gardens (AU); Ian Howard Pendergrast, Woodcroft (AU)

(73) Assignee: Innovation Central Pty Ltd, Hilton, South Australia (AU)

( * ) Notice: Subject to any disclaimer, the term of this patent is extended or adjusted under 35 U.S.C. 154(b) by 658 days.

(21) Appl. No.: 10/579,659

(22) PCT Filed: Nov. 18, 2004

(86) PCT No.: PCT/AU2004/001595

§ 371 (c)(1), (2), (4) Date: May 11, 2007

(87) PCT Pub. No.: WO2005/049453

PCT Pub. Date: Jun. 2, 2005

(65) Prior Publication Data

US 2008/0029676 A1 Feb. 7, 2008

(30) Foreign Application Priority Data

Nov. 18, 2003 (AU) .............................. 2003906339

(51) Int. Cl.
*A47B 95/00* (2006.01)
(52) U.S. Cl. .................................. 248/345.1
(58) Field of Classification Search ................ 248/345, 248/345.1, 74.2, 229.16, 229.26, 230.6, 231.81; 52/287.4; 428/71
See application file for complete search history.

(56) References Cited

U.S. PATENT DOCUMENTS

| | | | | |
|---|---|---|---|---|
| 3,446,345 A | * | 5/1969 | Frosoy | 206/453 |
| 4,106,739 A | * | 8/1978 | Gasser | 248/345.1 |
| 5,131,669 A | | 7/1992 | Kinnamon et al. | |
| 5,369,925 A | * | 12/1994 | Vargo | 52/244 |
| 5,701,635 A | * | 12/1997 | Hawkes | 16/421 |
| 6,025,047 A | * | 2/2000 | Catta et al. | 428/99 |
| 6,289,836 B1 | | 9/2001 | Tellex | |
| 2002/0053664 A1 | | 5/2002 | Moore | |

FOREIGN PATENT DOCUMENTS

| | | |
|---|---|---|
| CA | 2213109 A | 2/1999 |
| DE | 3039897 A | 5/1982 |
| EP | 319362 B | 5/1992 |

(Continued)

*Primary Examiner*—Ramon O Ramirez
(74) *Attorney, Agent, or Firm*—Knobbe Martens Olson & Bear LLP

(57) ABSTRACT

The invention relates to a protecting apparatus (10) for protecting a structure (100) from an impact. The protecting apparatus (10) is arranged to be mounted on the structure (100) and includes a bumper member (12), a structure positioning member (14) and at least one resiliently flexible joining portion (16). The structure positioning member (14) is arranged in use to be positioned in contact with or adjacent to a portion of the structure (100) being protected. The at least one resiliently flexible joining portion (16) extends between the bumper member (12) and the structure positioning member (14) so that when an outer surface (12a) of the bumper member (12) is impacted, the impact force is dissipated at least in part by flexure of the at least one joining portion (16).

19 Claims, 8 Drawing Sheets

FOREIGN PATENT DOCUMENTS

| | | |
|---|---|---|
| EP | 0 904 988 A2 | 3/1999 |
| FR | 2 548 238 | 1/1985 |
| FR | 2779162 A | 12/1999 |
| FR | 2 788 796 | 7/2000 |
| JP | 10-227022 | 8/1998 |
| JP | 2001-26918 A | 1/2001 |
| WO | WO 86/00051 | 1/1986 |
| WO | WO 91/17320 A | 11/1991 |

* cited by examiner

RESILIENT PROTECTOR TO PROTECT A STRUCTURE FROM AN IMPACT

FIELD OF THE INVENTION

The invention relates to a protecting apparatus for protecting structures from impact damage.

BACKGROUND OF THE INVENTION

In many warehouses, goods are stored in racking systems and are accessed by fork lifts or other vehicles. The structural supports for such racking systems often become damaged because they are repeatedly impacted against by the fork lifts. Various protective devices have been developed in an attempt to prevent or at least limit damage to such structural supports.

The present invention seeks to provide an improved protecting apparatus which can be used to protect a wide variety of different structures.

SUMMARY OF THE INVENTION

According to the present invention there is provided a protecting apparatus for protecting a structure from an impact, said protecting apparatus being arranged to be mounted on the structure and including a bumper member, a structure positioning member and at least one resiliently flexible joining portion, said structure positioning member being arranged in use to be positioned in contact with or adjacent to a portion of the structure being protected, said at least one resiliently flexible joining portion extending between said bumper member and said structure positioning member so that when an outer surface of the bumper member is impacted the impact force is dissipated at least in part by flexure of said at least one joining portion.

The impact force may also be dissipated by flexure of said bumper member and/or the structure positioning member.

Preferably, each resiliently flexible joining portion adopts a tortuous path between the bumper member and the structure positioning member. The tortuous path is preferably curved so as to minimise any points of stress concentration along said path.

One end of said joining portion is preferably connected to the bumper member and the other end is preferably connected to the structure positioning member. Connection preferably occurs at a zone of connection so as to minimise stress concentrations in the protecting apparatus. Stress concentrations are preferably minimised by curving the zones of connection.

In accordance with a preferred embodiment of the invention, the bumper member has a first end and a second end, which ends are arranged to be joined to the structure positioning member by respective first and second resiliently flexible joining members. The first and second joining members, the first and second ends of the bumper member and the structure positioning member are shaped so as to define an opening in which the portion of the structure to be protected can be received.

Preferably, at or adjacent to each of the first and second ends of the bumper member is tongue. The tongue is arranged in use to contact the structure when it is located in the opening and to facilitate retention of the protector apparatus about said structure. A tongue may also be formed on each of the first and second joining members to further facilitate retention of the protecting apparatus about said structure.

The protecting apparatus may be arranged to be retained tightly on the structure (i.e. fixed in one position) or may be retained in a manner which allows it to be slid along a length thereof.

Preferably, the tongues are resiliently flexible and arranged so that they are deflected in order to receive the portion of the structure within the opening and, once the portion is located in the opening, arranged to engage against the structure.

As an alternative to the tongues or in addition thereto, a securing member may be provided to retain the protecting apparatus about said structure. The securing member may be a threaded member arranged to be screwed through the protecting apparatus and into the structure. A groove or slot may be provided in the protecting apparatus to receive the threaded member.

The bumper member is preferably configured so as to extend about a major portion of the structure so as to protect as much of the structure as possible.

The outer surface of the bumper member is preferably smooth and continuous.

The protecting apparatus is preferably formed so that a plurality of such apparatus can be located along a length of the structure. The plurality of protecting apparatus may be spaced from one another or arranged so that they stack one on top of the other.

The bumper member, structure positioning member, first and second joining members and said at least one joining portion are preferably integrally formed. In accordance with an embodiment of the invention, the protecting apparatus in moulded, for example by injection moulding. However, the protecting apparatus may also be extruded. The protecting apparatus may be made from any suitable thermoplastic material or from a rubber.

The material from which the protecting apparatus is made is preferably selected with consideration to the environment in which it is to be used (e.g. extreme temperature environments, high u.v. ray environments, corrosive environments).

DESCRIPTION OF THE DRAWINGS

Embodiments of the invention will now be described, by way of example only, with reference to the accompanying drawings in which.

DETAILED DESCRIPTION OF THE PREFERRED EMBODIMENTS

Figure 1:
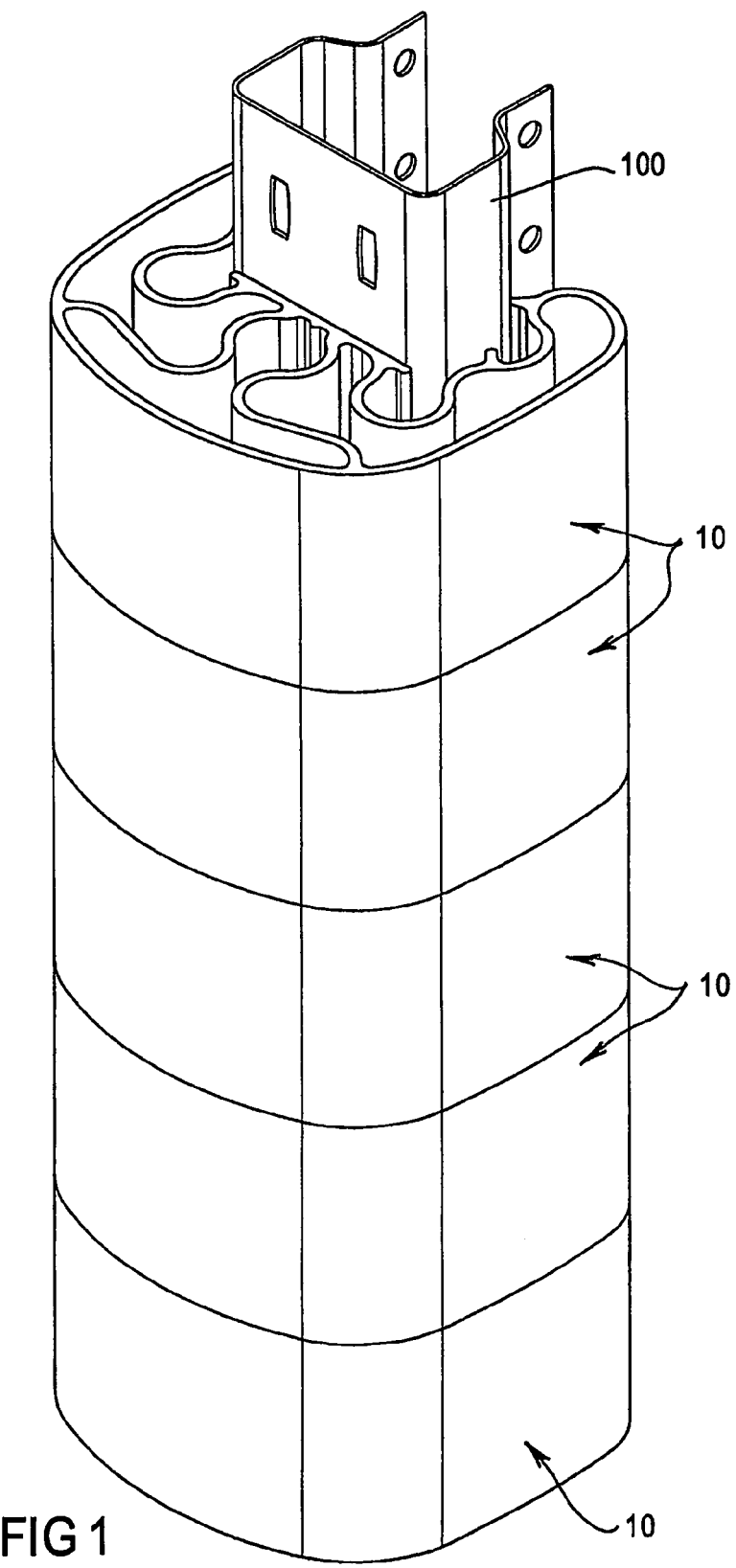
FIG. 1 is a view of a structural support on which are located five individual protector apparatus in accordance with a first embodiment of the invention.

FIG. 1 illustrates five different protecting apparatus 10 located about a structural support 100 for a racking system. The protecting apparatus 10 are stacked one on top of the other so as to provide protection for a substantial portion of the length of the structural support 100.

Figure 2:
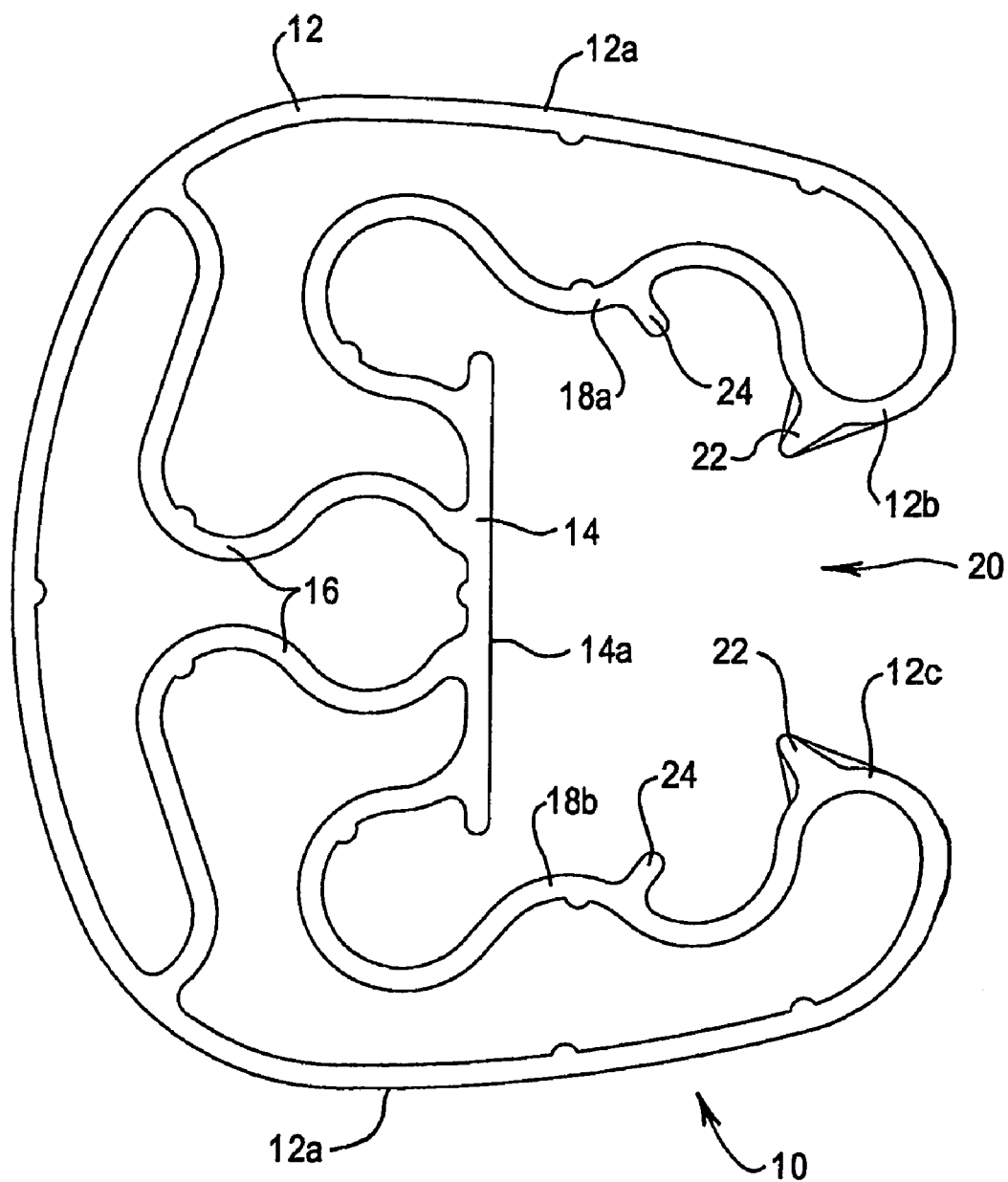
FIG. 2 is a plan view of one of the protector apparatus shown in FIG. 1.
Figure 3:
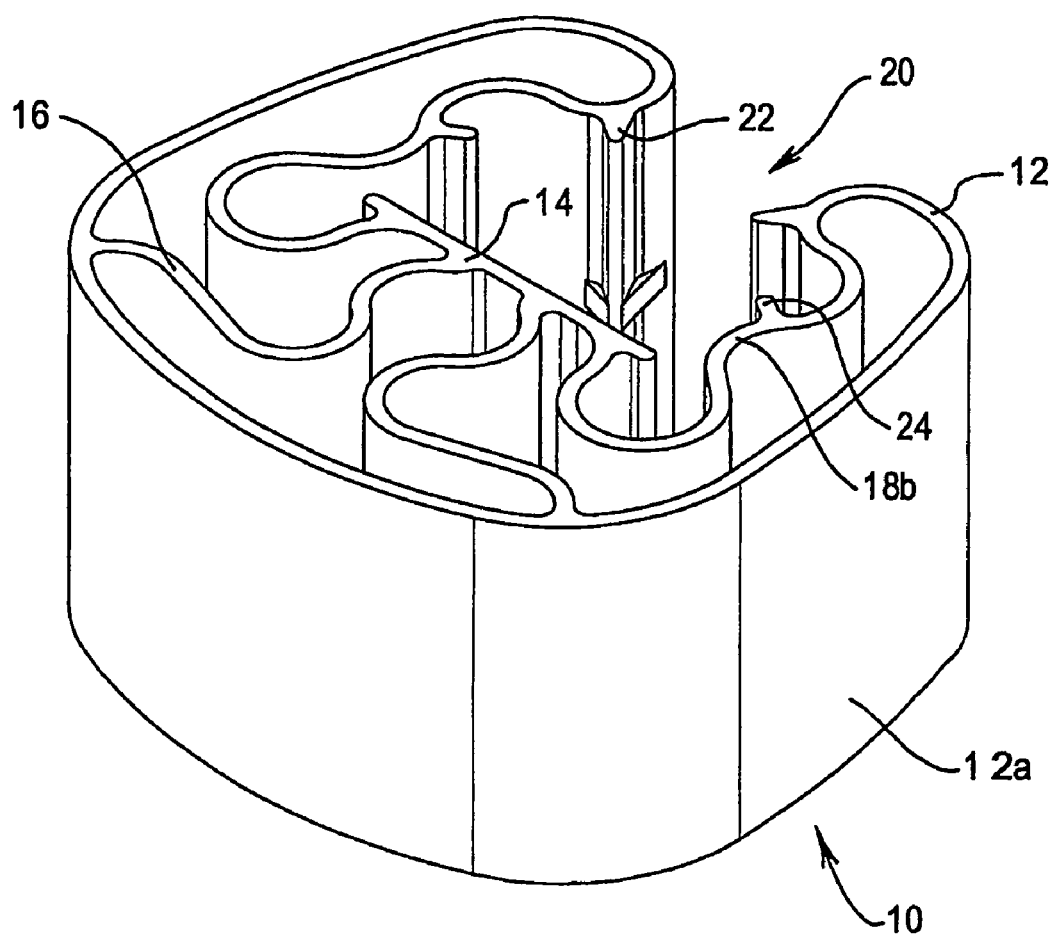
FIGS. 3 and 4 are perspective views of the protector apparatus shown in FIG. 2.
Figure 4:
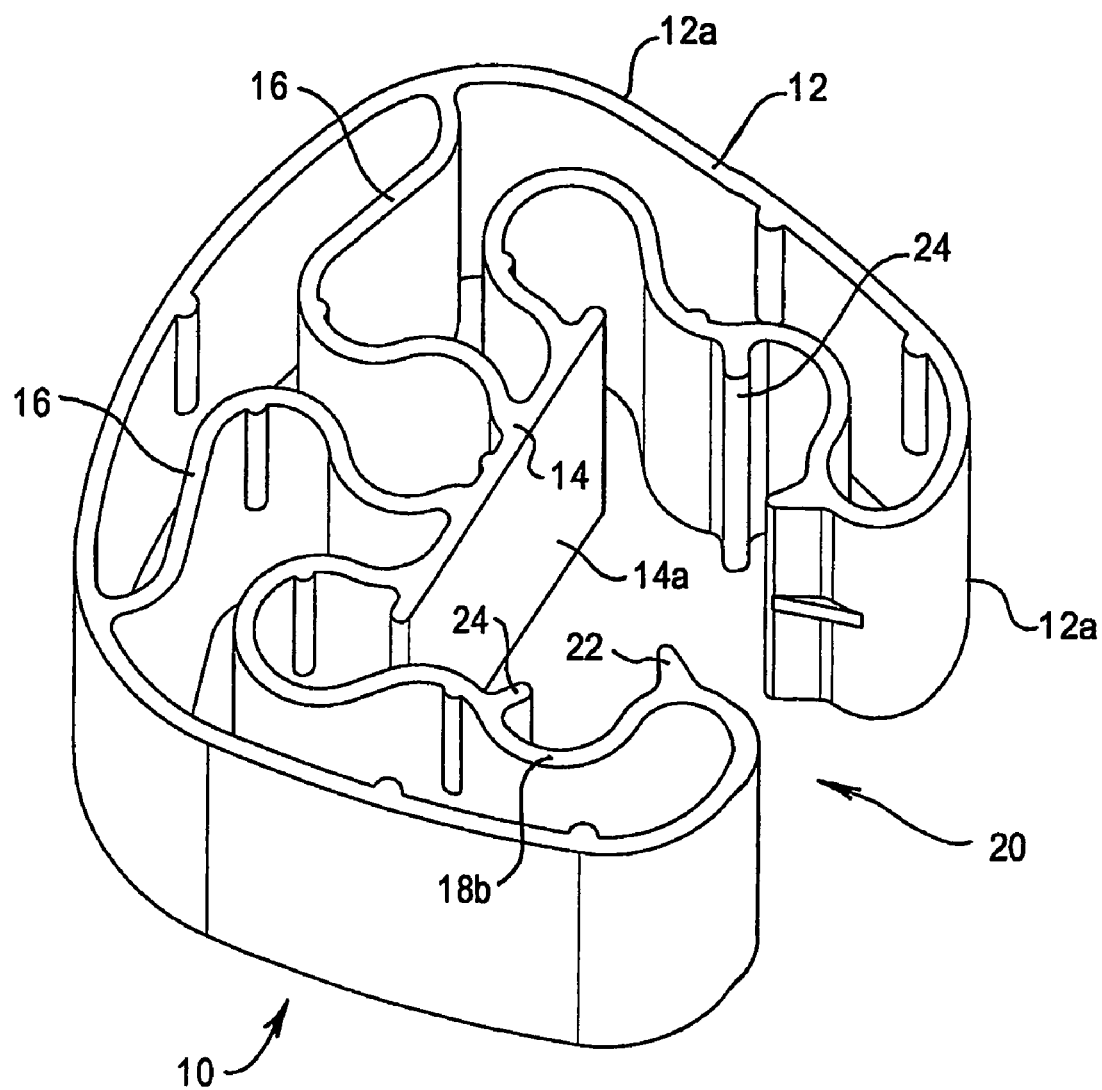

FIG. 2 illustrates one of the protecting apparatus 10 shown in FIG. 1. As shown, the protecting apparatus 10 includes a bumper member 12 and a structure positioning member 14. As best illustrated by FIG. 1, the structure positioning member 14 has an outer surface 14a which is arranged in use to be positioned in contact with or adjacent to a portion of the structural support 100.

The bumper member 12 and the structure positioning member 14 are joined by resiliently flexible joining portions 16. Two joining portions 16 are illustrated. However, it will be appreciated that varying numbers of joining portions 16 may be included. The joining portions 16 are formed so as to be resiliently flexible such that when an outer surface 12a of the bumper member 12 is impacted, the impact force is dissipated at least in part by flexure of the joining portions 16. The impact force may also be dissipated by flexure of the bumper member 12 and/or the structure positioning member 14.

When the impact force is very high, some or all of the joining portions 16 may be caused to fracture sacrificially in order to prevent damage to the structural support 100. Similarly, the bumper member 12 and/or the structure positioning member 14 may also be caused to fracture. In such an event, it would be advisable to replace the damaged protecting apparatus 10 with a new one so as to ensure continued protection of the structural support 100.

As best illustrated in FIG. 2, each joining portion 16 adopts a tortuous path between the bumper member 12 and the structure positioning member 14. The tortuous path is preferably curved so as to minimise any points of stress concentration along the path. A tortuous path is adopted so as to better enable the joining portion 16 to accommodate impact forces. It will be appreciated that each resiliently flexible joining portion 16 acts like a spring between the bumper member 12 and the structure positioning member 14 when an impact force is applied.

One end of each joining portion 16 is connected to the bumper member 12 and the other end is connected to the structure positioning member 14. These respective connections preferably occur at a "zone" of connection (as opposed to a "point" of connection) so as to minimise stress concentration in these zones of the protecting apparatus 10. The zones of connection are preferably formed as smooth curves so as to thereby minimise stress concentrations.

The bumper member 12 has a first end 12b and a second end 12c. The ends 12b, 12c of the bumper member 12 are connected to the structure positioning member 14 by respective first and second resiliently flexible joining members 16a, 16b. As shown in FIG. 2, the first and second joining members 18a, 18b and the structure positioning member 14 define an opening 20 in which the structural support 100 can be received.

Adjacent each end 12b, 12c of the bumper member 12 is a tongue 22. The tongues 22 are arranged in use to contact the structural support 100 when it is located in the opening 20 and to facilitate retention of the protecting apparatus 10 about the structural support 100. In accordance with a preferred embodiment, the tongues 22 are resiliently flexible. This enables the protecting apparatus 10 to be located about the structural support 100 by aligning the structural support 100 with the opening 20 and then pushing the protecting apparatus 10 there against. This will cause the tongues 22 to deflect so as to allow the structural support 100 to be received in opening 20. When the structural support 100 is received in the opening 20, the resiliently flexible nature of the tongues 22 causes them to try to return to their original orientation, resulting in them engaging against the structural support 100. This engagement facilitates retention of the protecting apparatus 10 about the structural support 100.

Additional tongues 24 may be provided on the first and the second joining members 18a, 18b to further facilitate retention of the protecting apparatus 10 about the structural support 100.

In addition to the tongues 22, 24 or in place thereof, a securing member (not shown) may be provided to retain the protecting apparatus 10 about the structural support 100. The securing member may be a threaded member arranged to be screwed through the protecting apparatus 10 and into the structural support 100. A groove or slot may be provided in the protecting apparatus 10 to receive the threaded member.

In accordance with the illustrated embodiment, the outer surface 12a of the bumper member 12 is shown as being smooth and continuous. However, other finishes on the outer surface 12a may be adopted.

The bumper member 12, structure positioning member 14, joining portions 16 and joining members 18a, 18b are integrally formed. The protecting apparatus 10 is preferably moulded as one piece in a plastics material. The protecting apparatus 10 is preferably injection moulded or may be extruded as a continuous form.

As will be appreciated from FIG. 1, each protecting apparatus 10 is arranged to wrap about a major portion of the periphery of the structural support 100 to provide substantial coverage and therefore protection thereof. A plurality of protecting apparatus 10 can be located on the structural support 100 so as to provide protection to the entire length of the structural support 100 if desired. The protecting apparatus 10 may be spaced from one another or stacked one on top of the other.

The length of the protecting apparatus 10 (i.e. the dimension of the apparatus 10 in a direction parallel to the length of the structural support 100) may be varied to suit different needs. However, it is recognised that it may be advantageous to use a plurality of smaller protecting apparatus 10 to protect a structural support 100 rather than a very large apparatus 10. This is because in a situation where a fracture occurs in the protecting apparatus 10, it may be more cost effective to replace a number of smaller protective apparatus 10 as opposed to a single large protecting apparatus 10.

Figure 5:
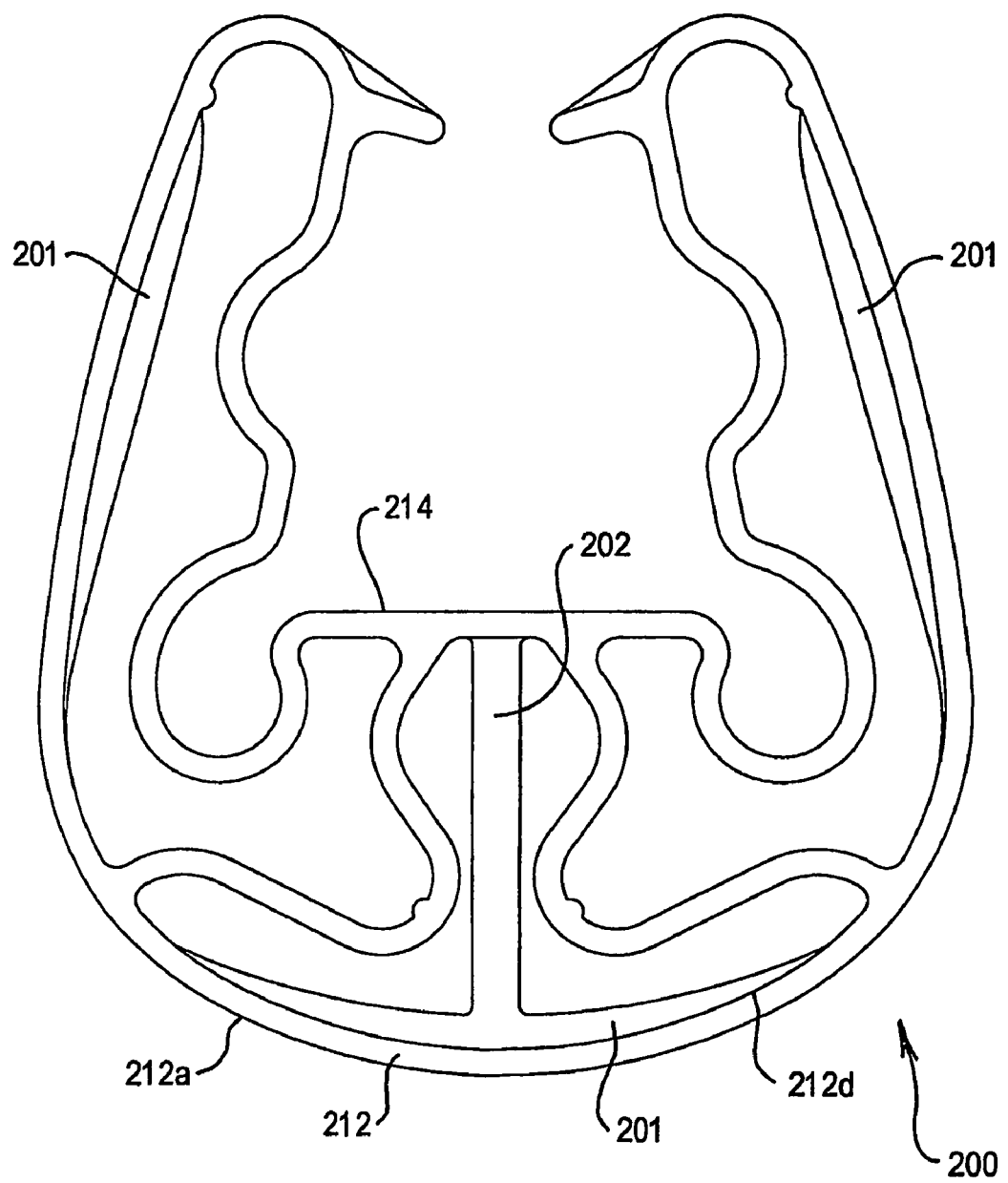
FIG. 5 is a plan view of a protector apparatus according to a second embodiment of the invention.
Figure 6:
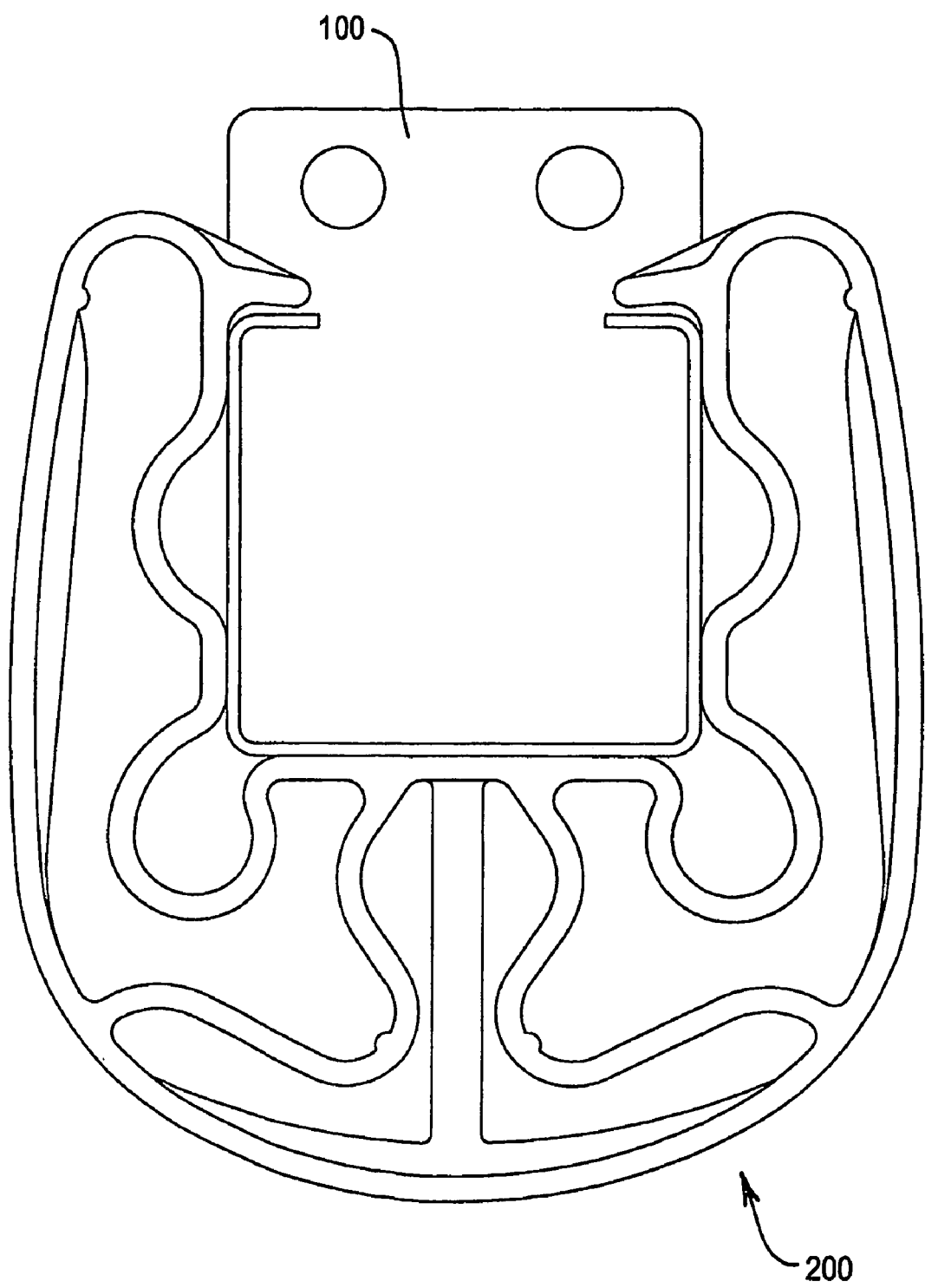
FIG. 6 is a plan view of the protector apparatus shown in FIG. 5 attached to a structure.

FIGS. 5 and 6 illustrate a protector apparatus 200 in accordance with a second embodiment of the invention. The protector apparatus 200 adopts a slightly different shape to the protector apparatus 10. Additionally, strengthening ribs 201 have been provided at various locations along an inner surface 212d of the bumper member 212. The strengthening ribs 201 have been provided to control the flexure of the bumper member 212. A cross member 202 has also been provided to extend between the bumper member 212 and the structure positioning member 214. The cross member 202 is provided to enable advertising information or other information to be stamped or moulded onto the protecting apparatus 200.

As shown in FIG. 6, when the protector apparatus 200 is pushed onto the structural support 100 flexure of the protector apparatus 200 occurs. This results in some distortion of the shape of the protector apparatus 200.

Figure 7:
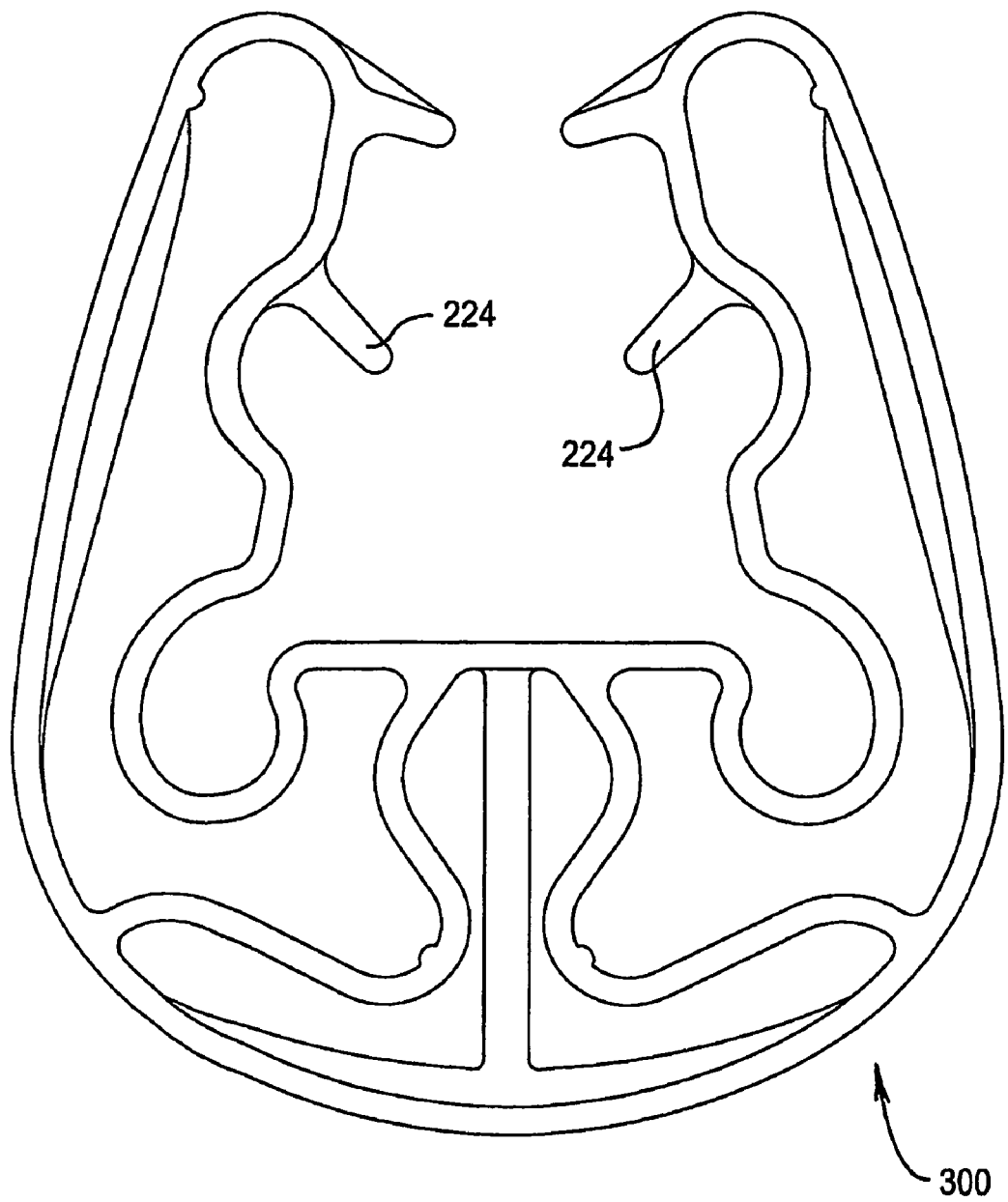
FIG. 7 is a plan view of a protector apparatus according to a third embodiment of the invention.
Figure 8:
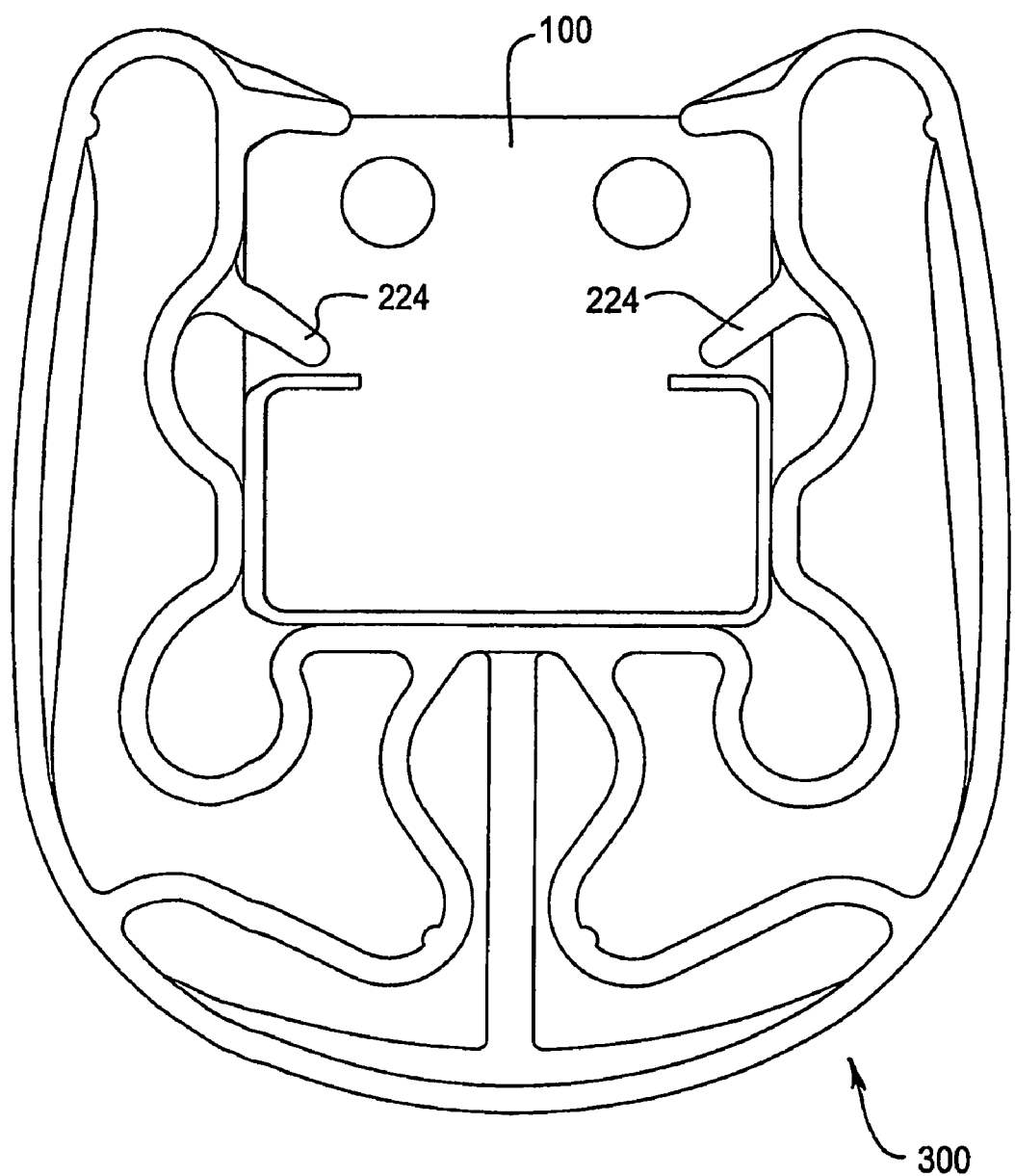
FIG. 8 is a plan view of the protector apparatus shown in FIG. 7 attached to a structure.

FIGS. 7 and 8 illustrate a protector apparatus 300 in accordance with a third embodiment of the invention. The protector apparatus 300 is similar to the apparatus 200 shown in FIGS. 5 and 6. However, it will be appreciated that the protector apparatus 300 includes tongues 224 to further facilitate retention of the protecting apparatus 300 about the structural support 100.

It will also be appreciated that different coloured or patterned protecting apparatus 10 could be provided. Thus, by stacking numerous protecting apparatus 100 one on top of the other, different patterns etc could be achieved.

It will be appreciated by those skilled in the art that the material from which the protecting apparatus is made may need to vary and be selected to accommodate different working environments. For example, different materials may need to be used if the protecting apparatus was used in an extremely cold environment (for example, a cold room) as compared to when the protecting apparatus was used in a corrosive environment.

It is envisaged that protecting apparatus in accordance with an embodiment of the invention would have application in a wide variety of areas. For example, such protecting apparatus may be used to protect structural supports for racking systems, rails, columns, balustrades, posts, wall edges, vehicle edges, garage supports, signage and attachments to heavy transport vehicles and caravans.

It will also be appreciated that the configuration of a protecting apparatus in accordance with an embodiment of the invention will vary in order to enable it to be fitted to structural supports and structures of different configurations. To this end, for example, the size and configuration of the opening 20 and the tongues 22, 24 may need to be varied.

Embodiments of the invention provide a very simple but yet effective way of providing impact protection to many different forms of structures. Additionally, protecting apparatus according to the invention are relatively simple and cost effective to manufacture, are easily installed and easily replaced when damaged.

The embodiments have been described by way of example only and modifications within the spirit and scope of the invention are envisaged.

The discussion of the background to the invention herein is included to explain the context of the invention. This is not to be taken as an admission that any of the material referred to was published, known or part of the common general knowledge as at the priority date of any of the claims.

The invention claimed is:

1. A protecting apparatus for protecting a structure from an impact, said protecting apparatus including a bumper member arranged in use to receive an impact force, a structure positioning member arranged to be positioned in contact with or adjacent to a portion of the structure, a first joining member joining a first end of the structure positioning member to a first end of the bumper member and a second joining member joining a second end of the structure positioning member to a second end of the bumper member so that said structure positioning member and said first and second joining members define an opening for receiving at least said portion of the structure and at least one resiliently flexible joining portion extending between said bumper member and said structure positioning member arranged so that when an outer surface of the bumper member is impacted said impact force is dissipated at least in part by flexure of said at least one joining portion.

2. A protecting apparatus according to claim 1 wherein said impact force is further dissipated by flexure of said bumper member and/or flexure of said structure positioning member and/or fracture of said at least one joining portion.

3. A protecting apparatus according to claim 1, wherein said at least one resiliently flexible joining portion adopts a tortuous path between the bumper member and the structure positioning member.

4. A protecting apparatus according to claim 1 wherein the tortuous path is curved so as to minimize any points of stress concentration along said path.

5. A protecting apparatus according to claim 1 wherein said first and second joining members join to said bumper member and said structure positioning member at respective zones of connection so as to minimize stress concentrations in the protecting apparatus.

6. A protecting apparatus according to claim 1 wherein the first and second joining members each adopt a tortuous path between the respective ends of the positioning member and the bumper member.

7. A protecting apparatus according to claim 6 wherein the first and second joining members are resiliently flexible.

8. A protecting apparatus according to claim 7 wherein the first and second joining members and the bumper member are arranged to resiliently deflect to enable said portion of said structure to be received in said opening.

9. A protecting apparatus according to claim 1 wherein said at least one joining portion joins to the respective bumper member and structure positioning member at respective zones of connection so as to minimize stress concentrations in the protecting apparatus.

10. A protecting apparatus according to claim 9 wherein said stress concentrations are minimized by curving the zones of connection.

11. A protecting apparatus according to claim 1 wherein a tongue is located at or adjacent to each of the first and second ends of the bumper member, said tongues being arranged in use to contact the structure when it is received in said opening and to facilitate retention of the protecting apparatus about said structure.

12. A protecting apparatus according to claim 11 wherein a further tongue is provided on each of the first and second joining members to further facilitate retention of the protecting apparatus about said structure.

13. A protecting apparatus according to claim 11 wherein the tongues are resiliently flexible and arranged so that they are deflected in order to receive the portion of the structure within the opening and, once the portion of the structure is located in the opening, arranged to engage against the structure.

14. A protecting apparatus according to claim 1 arranged to be retained tightly on the structure or to be retained in a manner which allows it to be slid along a length thereof.

15. A protecting apparatus according to claim 1 wherein the bumper member is configured so as to extend about a major portion of the structure so as to protect as much of the structure as possible.

16. A protecting apparatus according to claim 1 wherein the outer surface of the bumper member is smooth and continuous.

17. A protecting apparatus according to claim 1 wherein the bumper member, structure positioning member, first and second joining members and said at least one joining portion are integrally formed.

18. A protecting apparatus according to claim 17 wherein the protecting apparatus is molded as a single piece in a plastics material.

19. A protecting apparatus according to claim 1 arranged so that a plurality of such protecting apparatus can be stacked one on top of the other along a length of the structure.

* * * * *